UNITED STATES PATENT OFFICE.

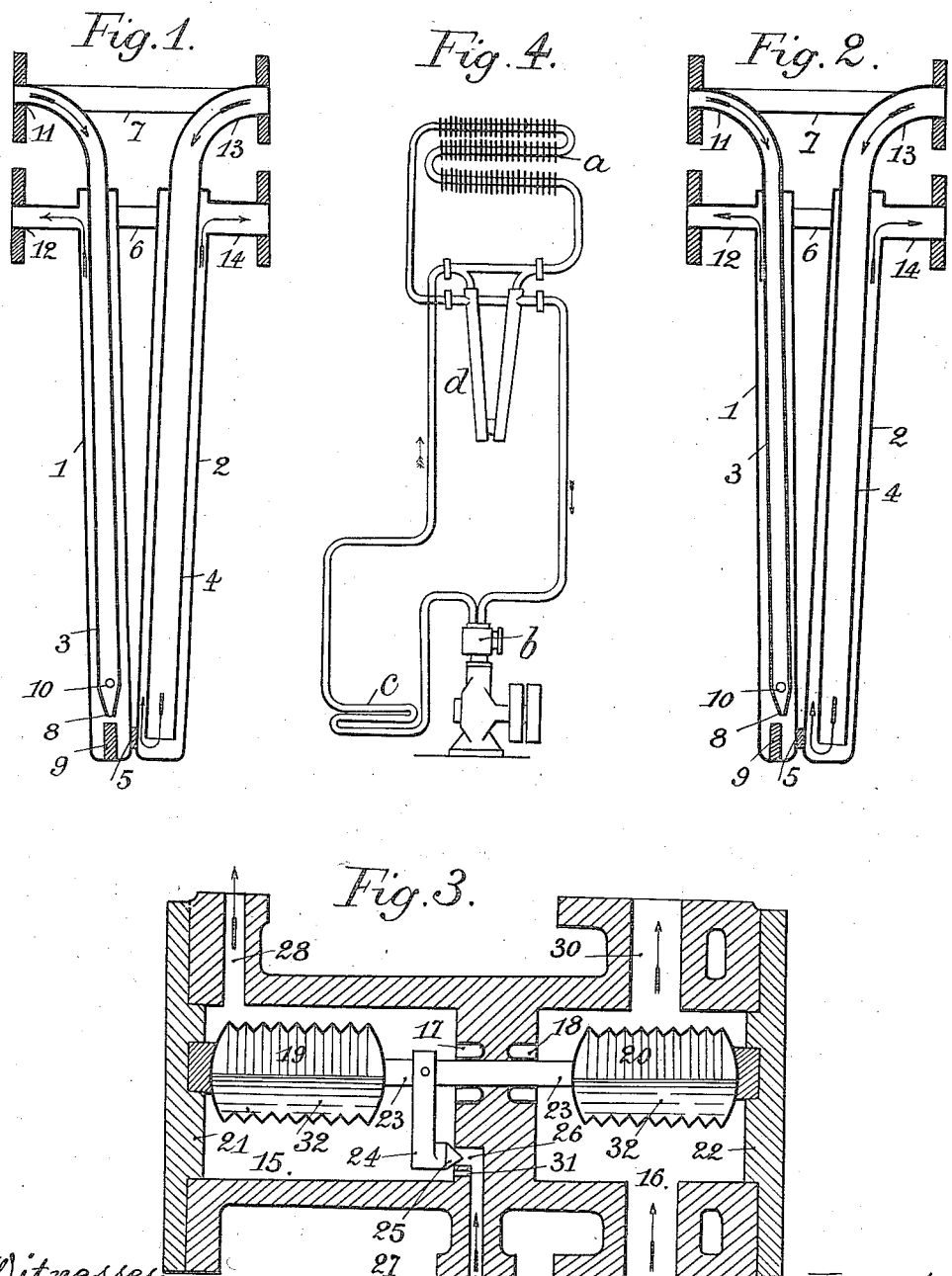

FRÉDÉRIC AUGUSTIN POLLARD, OF PARIS, FRANCE.

APPARATUS FOR THE AUTOMATIC REGULATION OF REFRIGERATING-MACHINES.

971,788.      Specification of Letters Patent.      Patented Oct. 4, 1910.

Application filed December 4, 1908. Serial No. 466,028.

*To all whom it may concern:*

Be it known that I, FRÉDÉRIC AUGUSTIN POLLARD, of 165 Boulevard Voltaire, Paris, France, engineer, have invented a new and useful Improvement Relating to Apparatus for the Automatic Regulation of Refrigerating-Machines, which improvement is fully set forth in the following specification.

This invention relates to apparatus for the automatic regulation of refrigerating machines which utilize liquefied gases such as sulfuric acid, methyl chlorid, ammonia, carbonic acid and the like. In nearly all forms of apparatus of this type, the distribution of the liquefied gas to the coil or other refrigerating vessel is regulated by hand. This is practicable with machines which always work under the same conditions of speed and temperature. There are, however, cases in which, by reason of variations in the conditions of working, such as variations in the speed of the compressor, in the temperature of the medium to be cooled (air, gas or liquid), or in the temperature at which the liquefied gas condenses, a single adjustment does not suffice, but the man in charge of the mechine is compelled to continually adjust the distribution of the liquefied gas, in order to obtain so far as possible the maximum efficiency of the machine under the varying conditions.

Apart from the advantage that there is in automatically regulating all refrigerating machines in the manner most conducive to efficiency, it is absolutely essential with machines intended to operate without any supervision under most extreme conditions of working, for example, when the machine is employed to refrigerate moving vans or carriages and is driven directly from one of the axles, in order that the machine shall work with the maximum efficiency at all speeds of the compressor, at any and all the temperatures of the compartment, and at various condensation temperatures of the liquefied gas. Refrigerating plants have been constructed which endeavor to obtain this result by the combination of several devices, one of which regulates the operation according to the speed of the compressor and the other according to the temperature of the medium to be cooled.

The principle of my invention is based upon the observation, resulting both from theory and experiment, that the most advantageous method of working refrigerating machines is obtained when the compressor is drawing in dry saturated gas, whatever may be the speed of the compressor and the temperatures of vaporization and condensation of the liquefied gas. The method employed by me for attaining this object consists in slightly overheating the gas sucked in by the compressor, this being obtained by passing the saturated gas through a radiator placed, either in the fluid to be refrigerated or in the surrounding atmosphere, and in utilizing the difference of the temperatures of the gas at its entry into the refrigerator and at its outlet from the radiator to actuate a valve controlling the flow of the liquefied gas.

According to this invention, also, is utilized the unequal variations in length of two bodies of any section and shape, solid or hollow, or filled entirely or partly with a volatile or other liquid, when submitted, the one to the temperature of the gas at its entrance into the refrigerator, and the other at its outlet from the radiator. The variation in length of these rods, which may be amplified by levers or other devices, is employed to actuate the inlet valve, which must be closed when the two bodies of the regulating apparatus are at the same temperatures and entirely open when the predetermined maximum difference exists between these temperatures. When the compressor of the machine is at rest, the temperature of the two bodies having become equal, the valve would remain closed indefinitely even if the compressor be again set in motion, and no liquefied gas would pass into the refrigerator. In order to permit starting under these conditions, a hole of small size is permanently arranged in the regulating apparatus or valve in order that when starting there may be obtained a suitable difference between the temperatures of the bodies and the apparatus may consequently be able to start. The radiator may, moreover, for the sake of greater simplicity consist of the end of the refrigerator.

In the accompanying drawings two different methods of carrying out the invention have been shown.

Figure 1 is a sectional view of one form of construction with the regulating valve closed; Fig. 2 is a similar view of the same form with the regulating valve open; and Fig. 3 is a similar view of another form of construction, with the regulating valve closed. Fig. 4 is a plan view of the complete apparatus.

Figs. 1 and 2 show an apparatus which works by the expansion of two hollow rods or tubes 1 and 2, which contain each a concentrically arranged inner tube 3 and 4 so disposed as to obtain a circulation of the refrigerating gas in the annular space between them and to bring the outer tubes to the temperatures of such gas. The brackets 5, 6 and 7 are solid and merely insure the support and connection of the rods 1 and 2. The parts 5 connect the tubes 1 and 2, and the parts 6, 7, 11, 12, 13 and 14 form a rigid whole for the support of the regulating device. The inner tube 3 is flattened at its open end 8 and the outer tube 1 carries an inner projection 9 which just clears the end of the tube 3 and closes the hole 8 when the rods 1 and 2 are of equal length and the tubes 1 and 2 are concentric. The hole 10 serves to start the apparatus. The pipe 11 communicates with the condenser of the machine or the reservoir of liquefied gas, the pipe 12 with the inlet to the refrigerator, the pipe 13 with the outlet from the refrigerator and the pipe 14 with the suction of the compressor. When the compressor is started, the liquefied gas which passes from 3 to 1 through the hole 10 vaporizes and cools, contracting the tube 1 which, by reason of the tube 2 being as yet uncooled, deforms the triangles formed by the tubes 1 and 2 and the brackets 5, 6 and 7, as shown in Fig. 2 of the drawing. The tube 3 which substantially preserves its original position has its orifice 8 uncovered by the displacement of the projection 9 fixed to the tube 1. The liquefied gas thereupon passes through hole 8 into the annular space comprised between the tubes 1 and 3 and thence into the refrigerator through the pipe 12. The projection 9 remains in its completely open position until the refrigerator has been sufficiently supplied with liquefied gas for the gas to pass out saturated from the refrigerator and consequently at the temperature of vaporization. The aspirated gas reëntering the apparatus through the tube 13 cools the tube 2 which also contracts, bringing the triangle formed by the system of tubes back nearly to its original shape. The hole 8 is again partially closed by the projection 9 until the predetermined difference between the temperatures of the gas at its inlet into the refrigerator and into the regulating apparatus is obtained.

Fig. 3 shows the second form of this invention consisting of an apparatus whose working is based upon the expansion of two masses of liquid contained within two elastic tubes, or upon the expansion of a gas liquefied at varying pressure according to its temperature and contained in the same way within elastic tubes. This apparatus consists of two containers 15 and 16 placed opposite each other and separated by a partition provided with glands 17 and 18. Within each container is an elastic tube inclosing a liquid or liquefied gas acting by expansion. These elastic tubes are fixed to the ends 21 and 22 of the containers 15 and 16, and are connected together rigidly by the rod 23 passing through the glands 17 and 18. The arm 24 fixed upon the rod 23 and provided with a valve 25 closes the hole 26, which communicates through the pipe 27 with the condenser, when the compressor of the refrigerating machine is at rest. The pipe 28 communicates with the entrance to the refrigerator, the pipe 29 with the outlet from the refrigerator, and the pipe 30 with the suction of the compressor. A small hole 31, which places the pipe 27 and the receiver 15 into communication, insures the starting of the apparatus. When the compressor of the refrigerating machine is at rest, the temperatures of the liquid or of the liquefied gas 32 contained within the elastic tubes 19 and 20 are equal, the expansion of the tubes will thus be equal and in opposite directions and the rod 23 will not move. So soon as the compressor is started the liquefied gas introduced from 27 to 15 through the permanent hole 31 vaporizes and lowers the temperature of the elastic tube 19 and of the liquid or gas which it contains, whence the pressure exerted by the tube 20 will predominate and displace the rod 23 and move the valve 25 toward the left of the figure and opens the hole 26. When by reason of the introduction of an excess of liquefied gas into the refrigerator, the difference in the temperatures of this gas at its outlet from the regulating apparatus and from the refrigerator tends to become *nil*, the tube 20 will in its turn contract, thus causing the valve 25 to partially close the orifice 26 until suitably regulated.

Obviously, this device is equally well suited for regulating either cooling or heating systems, the differences in temperatures at the inlet and outlet of the radiator (whether a cooling or heating coil) serving in either case to control the valve, and the term refrigerator is used herein in a generic sense as applying to a temperature modifying body.

What I claim and desire to secure by Letters Patent is:—

1. In a regulator for refrigerating machines, a valve controlling the flow of the refrigerating fluid, a thermostat under the influence of the refrigerating fluid on the inlet side of the refrigerator and operatively connected to the valve, and a second thermostat under the influence of the fluid on the exhaust side of the refrigerator and also connected to the valve.

2. In a regulator for refrigerating machines, a valve controlling the flow of the refrigerating fluid, a thermostat under the influence of the refrigerating fluid on the inlet side of the refrigerator and operatively connected to the valve, and a second thermostat under the influence of the fluid on the exhaust side of the refrigerator and also connected to the valve, the cooling of the first thermostat tending to open the valve and the cooling of the second to seat the same.

3. In a regulator for refrigerating machines, a valve controlling the flow of the refrigerating fluid, a thermostat under the influence of the refrigerating fluid on the inlet side of the refrigerator and operatively connected to the valve, and a second thermostat under the influence of the fluid on the exhaust side of the refrigerator and also connected to the valve, the cooling of the first thermostat tending to open the valve and the cooling of the second to seat the same, the device provided with a permanently open by-pass around the valve to influence the first thermostat.

4. In a regulator for refrigerating machines, a valve controlling the flow of the refrigerating fluid, a thermostat under the influence of the refrigerating fluid on the inlet side of the refrigerator and operatively connected in a rigid manner to the valve, and a second thermostat under the influence of the fluid on the exhaust side of the refrigerator and also connected in a rigid manner to the valve.

5. In a regulator for refrigerating machines, a valve controlling the flow of the refrigerating fluid, a thermostat under the influence of the refrigerating fluid on the inlet side of the refrigerator and operatively connected in a rigid manner to the valve, and a second thermostat under the influence of the fluid on the exhaust side of the refrigerator and also connected in a rigid manner to the valve, the cooling of the first thermostat tending to open the valve and the cooling of the second to seat the same, the device provided with a permanently open by-pass around the valve to influence the first thermostat.

6. In a regulator for temperature modifying devices, a radiator, a valve controlling the flow of the modifying fluid through the radiator, two thermostats operatively connected to the valve and under the influence of the fluid, one on the inlet side and the other on the outlet side of the radiator, the cooling of one thermostat tending to open the valve and the cooling of the other to seat the same.

7. In a regulator for temperature modifying devices, a radiator, a valve controlling the flow of the modifying fluid through the radiator, two thermostats operatively connected to the valve and under the influence of the fluid, one on the inlet side and the other on the outlet side of the radiator, the cooling of one thermostat tending to open the valve and the cooling of the other to seat the same, the device provided with a permanently open by-pass around the valve to influence the valve-opening thermostat.

8. In a regulator for refrigerating machines, a refrigerator, a compressor supplying the refrigerating fluid thereto and exhausting the fluid therefrom, a valve controlling the flow of the fluid, a tube traversed by the fluid entering the refrigerator, a second tube traversed by the fluid leaving the refrigerator, and a connection between the tubes and the valve, the deformation of the first tube under change of temperature tending to open the valve and the deformation of the second tube tending to seat the same.

9. In a regulator for refrigerating machines, a refrigerator, a compressor supplying the refrigerating fluid thereto and exhausting the fluid therefrom, a valve controlling the flow of the fluid, a tube traversed by the fluid entering the refrigerator, a second tube traversed by the fluid leaving the refrigerator, and a connection between the tubes and the valve, the deformation of the first tube under change of temperature tending to open the valve and the deformation of the second tube tending to seat the same, the device provided with a permanent by-pass around the valve to deform the first tube.

10. In a regulator for refrigerating machines, a refrigerator, a compressor supplying the refrigerating fluid thereto and exhausting the fluid therefrom, a pair of tubes, one traversed by the fluid entering and the second by the fluid leaving the refrigerator, a valve normally closing the first tube, and a connection between the two tubes whereby the deformation by unequal cooling of the two tubes will open the valve.

11. In a regulator for refrigerating machines, a refrigerator, a compressor supplying the refrigerating fluid thereto and exhausting the fluid therefrom, a pair of tubes, one traversed by the fluid entering and the second by the fluid leaving the refrigerator, a valve normally closing the first tube, and a connection between the two tubes whereby the deformation by unequal cooling of the two tubes will open the valve, the valve provided with a reduced by-pass permanently open.

12. In regulator for refrigerating machines, a refrigerator, a compressor supplying the refrigerating fluid thereto and exhausting the fluid therefrom, a pair of tubes closed at one end and connected at the other end, the first to the refrigerator inlet and the second to the compressor inlet, a second pair of tubes arranged one within each tube of the first pair, the first tube of the second pair leading from the compressor and discharging within the first tube of the first pair near its closed end and the second tube of the second pair leading from the refrigerator and discharging within the second tube of the first pair near its closed end, a plug carried by the closed end of the first tube of the first pair and normally closing as a valve the discharge mouth of the first tube of the second pair, one end of each of the tubes of the first pair rigidly fixed, and a connection between the free ends of the first pair of tubes whereby deformation due to unequal cooling of the two tubes will unseat the valve by removing the plug laterally from the mouth of the first tube of the second pair.

13. In a regulator for refrigerating machines, a refrigerator, a compressor supplying the refrigerating fluid thereto and exhausting the fluid therefrom, a pair of tubes closed at one end and connected at the other end, the first to the refrigerator inlet and the second to the compressor inlet, a second pair of tubes arranged one within each tube of the first pair, the first tube of the second pair leading from the compressor and discharging within the first tube of the first pair near its closed end and the second tube of the second pair leading from the refrigerator and discharging within the second tube of the first pair near its closed end, a plug carried by the closed end of the first tube of the first pair and normally closing as a valve the discharge mouth of the first tube of the second pair, one end of each of the tubes of the first pair rigidly fixed, and a connection between the free ends of the first pair of tubes whereby deformation due to unequal cooling of the two tubes will unseat the valve by removing the plug laterally from the mouth of the first tube of the second pair, the first tube of the second pair provided with a permanently open small by-pass around the plug.

14. In a regulator for refrigerating machines, a refrigerator, a compressor supplying the refrigerating fluid thereto and exhausting the fluid therefrom, a pair of tubes closed at one end and connected at the other end, the first to the refrigerator inlet and the second to the compressor inlet, a second pair of tubes arranged one within each tube of the first pair, the first tube of the second pair leading from the compressor and discharging within the first tube of the first pair near its closed end and the second tube of the second pair leading from the refrigerator and discharging within the second tube of the first pair near its closed end, a plug carried by the closed end of the first tube of the first pair and normally closing as a valve the discharge mouth of the first tube of the second pair, one end of each of the tubes of the first pair rigidly fixed at a distance apart and the free ends of said tubes converging and connected together to form a triangle having a rigid base and flexible sides whereby deformation due to unequal cooling of the tubes forming the two sides of the triangle will laterally displace the plug from the mouth of the first tube of the second pair, the first tube of the second pair provided with a permanently open lateral orifice forming a by-pass around the plug.

In testimony whereof I have signed this specification in the presence of two subscribing witnesses.

FRÉDÉRIC AUGUSTIN POLLARD.

Witnesses:
LOUIS FRÉDÉRIC HARLÉ,
H. C. COXE.